(12) United States Patent
Mariamova et al.

(10) Patent No.: US 7,313,532 B2
(45) Date of Patent: Dec. 25, 2007

(54) COMPUTER IMPLEMENTED SYSTEM AND METHOD FOR DETERMINING THE MOST PROFITABLE DISTRIBUTION POLICY

(75) Inventors: Sofia Mariamova, Ashdod (IL); Michael Aronowich, Haifa (IL); Ofra Natan, Ramat Gan (IL); Henry Harel, Tel Aviv (IL)

(73) Assignee: Demantra Ltd., Ramat Gan (IL)

( * ) Notice: Subject to any disclaimer, the term of this patent is extended or adjusted under 35 U.S.C. 154(b) by 1244 days.

(21) Appl. No.: 10/230,411

(22) Filed: Aug. 29, 2002

(65) Prior Publication Data

US 2004/0006504 A1    Jan. 8, 2004

Related U.S. Application Data

(63) Continuation-in-part of application No. 10/187,791, filed on Jul. 3, 2002, now abandoned.

(51) Int. Cl.
*G06Q 10/00* (2006.01)
(52) U.S. Cl. .......................................................... 705/7
(58) Field of Classification Search .................... 705/7
See application file for complete search history.

(56) References Cited

U.S. PATENT DOCUMENTS 5,946,662 A * 8/1999 Ettl et al. ..................... 705/8
6,006,196 A * 12/1999 Feigin et al. ................. 705/10
6,970,841 B1 * 11/2005 Cheng et al. ................. 705/28

FOREIGN PATENT DOCUMENTS

EP          733986 A2 *  9/1996

OTHER PUBLICATIONS

"Optimal Pricing and Return Policies for Perishable Commodities", Barry Alan Pasternack. Marketing Science (pre-1986). Linthicum: Spring 1985. vol. 4, Iss. 2; p. 166 (11 pages).*
Consumer response to retail stockouts, Walter Zinn, Peter C Liu. Journal of Business Logistics. Oak Brook: 2001. vol. 22, Iss. 1; p. 49 (23 pages).*
Forward versus spot buying of information goods, Pavan Gundepdui, Nils Rudi, Abraham Seidmann. Journal of Management Information Systems. Armonk: Fall 2001. vol. 18, Iss. 2; p. 107 (25 pages).*
Masters, James M; "Determination of near optimal stock levels for multi-echelon distribution inventories" 1993, Journal of Business Logistics v14n2 pp. 165-195, Dialog 00798717 94-48109.*

(Continued)

*Primary Examiner*—Tariq R. Hafiz
*Assistant Examiner*—Jonathan G. Sterrett
(74) *Attorney, Agent, or Firm*—Townsend and Townsend and Crew LLP

(57) ABSTRACT

A computer implemented system and method for determining the most profitable distribution policy for a single period inventory system subject to a stochastic metric constraint that utilizes an optimization application, and including a Decision Support Tool for facilitating user determination of a distribution policy for a single period inventory system.

42 Claims, 10 Drawing Sheets

OTHER PUBLICATIONS

Sarmiento, Ana Maria; Nagi, Rakesh, "A review of integrated analysis of production-distribution systems", Nov. 1999, IIE Transactions, 31, 11, 1061, Dialog 12140672 61371579.*

Hopp, Wallace J.; Zhang, Rachel Q.; Spearman, Mark L; "An easily implementable hierarchical heuristic for a two-echelon spare parts distribution system.", Oct. 1999, IIE Transactions, 31, 10, 977, Dialog 12140148 61241887.*

Artto, et al., "An effective procedure for the distribution of magazines", 1999, International Transactions in Operational Research, 6 (1999) 289-310.*

Wecker, William E, "Predicting Demand from Sales Data in the Presence of Stockouts", Jun. 1978, Management Science, vol. 24, No. 10, pp. 1043-1054.*

Bell, Peter; "Adaptive Sales Forecasting with Many Stockouts", 1981, Journal of Operations Research Society, vol. 32, pp. 865-873.*

Bell, Peter; "A New Procedure for the Distribution of Periodicals", 1978, Journal of Operations Research Society, vol. 29, pp. 427-434.*

Bell, Peter; "Forecasting Demand Variations When There are Stockouts", 2000, Journal of Operations Research Society, vol. 51, pp. 358-363.*

Hadley et al., Chapter 6: Single Periods Models, *Analysis of Inventory Systems*, Prentice-Hall, 1963, pp. 304-307.

Silver et al., *Inventory Management and Production Planning and Scheduling*, 3d ed., Wiley, NY, 1998, pp. 406-422.

\* cited by examiner

| | LAGRANGE MULTIPLIER | AVAILABILITY | DRAW AT LOCATIONS | | | ES |
|---|---|---|---|---|---|---|
| | | | 1 | 2 | 3 | |
| 1 | 11.9 | 98.0% | 17 | 31 | 56 | 72.89 |
| 2 | 5.7 | 96.1% | 16 | 29 | 54 | 72.74 |
| 3 | 2.6 | 92.6% | 15 | 28 | 52 | 72.54 |
| 4 | 1.1 | 86.3% | 13 | 26 | 49 | 71.82 |
| 5 | 1.8 | 90.4% | 14 | 27 | 51 | 72.29 |
| 6 | 1.3 | 87.6% | 14 | 26 | 50 | 72.08 |
| | | | TOTAL: 90 | | | |

FIG.10

| | DRAW AT LOCATIONS | | | DRAW AT LOCATIONS | | | WINNING LOCATION | EXPECTED SALES |
|---|---|---|---|---|---|---|---|---|
| | 1 | 2 | 3 | 1 | 2 | 3 | | |
| 0 | 11 | 23 | 45 | −0.0226 | −0.0370 | −0.0337 | 1 | 69.77 |
| 1 | 12 | 23 | 45 | −0.0937 | −0.0370 | −0.0337 | 3 | 70.07 |
| 2 | 12 | 23 | 46 | −0.0937 | −0.0370 | −0.0704 | 2 | 70.36 |
| 3 | 12 | 24 | 46 | −0.0937 | −0.0866 | −0.0704 | 3 | 70.64 |
| 4 | 12 | 24 | 47 | −0.0937 | −0.0866 | −0.1031 | 2 | 70.88 |
| 5 | 12 | 25 | 47 | −0.0937 | −0.1283 | −0.1031 | 1 | 71.10 |
| 6 | 13 | 25 | 47 | −0.1483 | −0.1283 | −0.1031 | 3 | 71.31 |
| 7 | 13 | 25 | 48 | −0.1483 | −0.1283 | −0.1317 | 2 | 71.50 |
| 8 | 13 | 26 | 48 | −0.1483 | −0.1619 | −0.1317 | 3 | 71.67 |
| 9 | 13 | 26 | 49 | −0.1483 | −0.1619 | −0.1562 | 1 | 71.82 |
| 10 | 14 | 26 | 49 | −0.1874 | −0.1619 | −0.1562 | | 72.00 |
| | 14 | 26 | 49 | | | | | |
| | TOTAL: 89 | | | | | | | |

FIG.11

COMPUTER IMPLEMENTED SYSTEM AND METHOD FOR DETERMINING THE MOST PROFITABLE DISTRIBUTION POLICY

This application is a continuation in part application of U.S. patent application Ser. No. 10/187,791, filed Jul. 3, 2002 now abandoned, the entire contents of which are hereby incorporated by reference in its entirety.

FIELD OF THE INVENTION

The invention is in the field of determining distribution policies for single period inventory systems.

GLOSSARY OF TERMS

The following alphabetically listed terms together with their acronyms are employed in the description and claims of this application with respect to the present invention:

Availability $A_{ij}$, Optimal Availability $A_{ij}^*$, and Optimal Availability Matrix $A^*$ Availability $A_{ij}$ is an industry term referring to the probability of completely satisfying the demand for an $i^{th}$ consumer item where i=1, 2, ..., m at a $j^{th}$ location where j=1, 2, ..., n of a single period inventory system without an occurrence of a sellout due to insufficient draw at that location. In mathematical terms, $A_{ij}=F(\lambda_{ij},D_{ij})$ where F is the cumulative probability distribution function (cdf) of demand for the $i^{th}$ consumer item at the $j^{th}$ location, and $\lambda_{ij}$ and $D_{ij}$ are its mean demand and draw, respectively. The probability distribution function in the discrete case and the probability density function in the continuous case are both denoted by the letter "f". The optimal availability $A_{ij}^*$ of an $i^{th}$ consumer item at a $j^{th}$ location of a single period inventory system is a function of its unit retail price $p_{ij}$, its unit production cost $c_{ij}$, its unit return cost $g_{ij}$, and its unit stockout cost $b_{ij}$, and is that availability which maximizes the expected total profit realizable for that $i^{th}$ $j^{th}$ item-location of the single period inventory system. A unit return cost $g_{ij}$ is the difference between the expenses incurred upon returning a unit and its salvage value, and consequently it may assume either a positive or negative value. An optimal availability matrix $A^*$ is the matrix of optimal availabilities $A_{ij}^*$ for a single period inventory system, and degenerates to a single so-called optimal common availability $A^*$ in the case that the respective values of $p_{ij}$, $c_{ij}$, $g_{ij}$ and $b_{ij}$ are the same for all its $i^{th}$ $j^{th}$ item-locations.

Demand $X_{ij}$, Mean Demand $\lambda_{ij}$, and Mean Demand Matrix $\lambda$

The demand process for a consumer item at a location has a random but non-stationary nature, and therefore cannot be subjected to ensemble inferences based on a single realization. Mean demands $\lambda_{ij}$ for a consumer item at a location over time are presupposed to be the outcome of a stochastic process which can be simulated by a forecast model whilst the demand $X_{ij}$ for an $i^{th}$ consumer item at a $j^{th}$ location of a single period inventory system at a future point in time is a random variable with a conditional probability distribution conditioned on its mean demand $\lambda_{ij}$ at that point in time. A mean demand matrix $\lambda$ is a matrix of mean demands $\lambda_{ij}$.

Distribution Policy

A distribution policy is the delivered quantities of each $i^{th}$ consumer item where i=1, 2, ..., m at each $j^{th}$ location where j=1, 2, ..., n of a single period inventory system in accordance with a predetermined business strategy. The most profitable distribution policy for a single period inventory system is realized by an optimal draw matrix $D^*$. The most profitable distribution policy for a single period inventory system subject to a constraint is realized by an optimal constrained draw matrix $D^\wedge$.

Draw $D_{ij}$, Draw Matrix D, Optimal Draw Matrix $D^*$, and Weighted Total Draw TD Draw $D_{ij}$ is an industry term referring to the delivered quantity of an $i^{th}$ consumer item where i=1, 2, ..., m at a $j^{th}$ location where j=1, 2, ..., n of a single period inventory system. A draw matrix D is the matrix of draws $D_{ij}$ for all $i^{th}$ $j^{th}$ item-locations of a single period inventory system. The optimal draw matrix $D^*$ for a single period inventory system is the draw matrix maximizing the expected total profit realizable by a distribution policy therefor. The weighted total draw TD of all m consumer items at all n locations of a single period inventory system is given by $\Sigma\Sigma w_{ij}D_{ij}$ where $w_{ij}$ are the weights correspondingly associated with its $i^{th}$ $j^{th}$ item-locations.

Returns $R(\lambda_{ij},D_{ij})$, and Expected Weighted Total Returns $ER(\lambda,D)$ Returns $R(\lambda_{ij},D_{ij})$ is an industry term referring to the number of unsold units of an $i^{th}$ consumer item at a $j^{th}$ location of a single period inventory system, and is given by $R(\lambda_{ij},D_{ij})=\max(D_{ij}-X_{ij}, 0)$ where $D_{ij}$, $X_{ij}$, and $\lambda_{ij}$ are its draw, demand, and mean demand, respectively, at that location. The expected weighted total returns $ER(\lambda,D)$ of all m consumer items at all n locations of a single period inventory system is given by $ER(\lambda,D)=\Sigma\Sigma w_{ij}ER(\lambda_{ij},D_{ij})$ where $w_{ij}$ are the weights correspondingly associated with its $i^{th}$ $j^{th}$ item-locations, and $ER(\lambda_{ij},D_{ij})$ is the expected value of $R(\lambda_{ij},D_{ij})$. For a Poisson distribution of demand, $ER(\lambda,D)=\Sigma\Sigma w_{ij}[D_{ij}f(\lambda_{ij},D_{ij}-1)+(D_{ij}-\lambda_{ij})F(\lambda_{ij},D_{ij}-2)]$.

Sales $S(\lambda_{ij},D_{ij})$ and Expected Weighted Total Sales $ES(\lambda,D)$ Sales $S(\lambda_{ij},D_{ij})$ refers to the quantity of sold items of an $i^{th}$ consumer item at $j^{th}$ location of a single period inventory system as upper bounded by the draw $D_{ij}$ at that location at each point in time, and is given by $S(\lambda_{ij},D_{ij})=\min(D_{ij},X_{ij})=D_{ij}-R(\lambda_{ij},D_{ij})$, where $D_{ij}$, $X_{ij}$, and $\lambda_{ij}$ are its draw, demand, and mean demand, respectively, at that location. The expected weighted total sales $ES(\lambda,D)$ of all m consumer items at all n locations of a single period inventory system is given by $ES(\lambda,D)=\Sigma\Sigma w_{ij}ES(\lambda_{ij},D_{ij})$ where $w_{ij}$ are the weights correspondingly associated with its $i^{th}$ $j^{th}$ item-locations, and $ES(\lambda_{ij},D_{ij})$ is the expected value of $S(\lambda_{ij},D_{ij})$.

Single Period Inventory Systems

Single period inventory systems are largely concerned with consumer items having a limited shelf life at the end of which an item loses most, if not all, of its consumer value, and the stock of which at a $j^{th}$ location is not replenished to prevent an occurrence of a sellout. Such consumer items can include perishable goods, for example, fruit, vegetables, flowers, and the like, and fixed lifetime goods, for example, printed media publications, namely, daily newspapers, weeklies, monthlies, and the like. Two common degenerate problems of single period inventory systems are known in the industry as the so-called "newsvendor" problem i.e. the sale of the same item throughout a multi-location single period inventory system and the so-called "knapsack" problem i.e. the sale of different items at the same location.

Stockout $ST(\lambda_{ij}, D_{ij})$, and Expected Weighted Total Stockout $EST(\lambda, D)$ Stockout $ST(\lambda_{ij}, D_{ij})$ is the quantity of unsatisfied demand for an $i^{th}$ consumer item at a $j^{th}$ location of a single period inventory system, and is given by $ST(\lambda_{ij}, D_{ij}) = \max(X_{ij} - D_{ij}, 0) = X_{ij} - S(\lambda_{ij}, D_{ij})$ where $D_{ij}$, $X_{ij}$, and $\lambda_{ij}$ are its draw, demand, and mean demand, respectively, at that location. The expected weighted total stockout $EST(\lambda, D)$ of all m consumer items at all n locations of a single period inventory system is given by $EST(\lambda, D) = \Sigma\Sigma w_{ij} EST(\lambda_{ij}, D_{ij}) = \Sigma\Sigma w_{ij} (\lambda_{ij} - ES(\lambda_{ij}, D_{ij}))$, where $w_{ij}$ are the weights correspondingly associated with its $i^{th}$ $j^{th}$ item-locations, and $EST(\lambda_{ij}, D_{ij})$ is the expected value of $ST(\lambda_{ij}, D_{ij})$.

Weights $w_{ij}$, and Weighted Totals

Weights $w_{ij}$ are employed in the calculation of weighted totals to differentiate between item-locations in terms of their relative importance to satisfy some business objectives such as cost, goodwill, exposure to preferred populations, and the like. Thus, for example, the weighted total draw $\Sigma\Sigma w_{ij} D_{ij}$ can represent a total budget in the case that $w_{ij}$'s haved pecuniary values.

BACKGROUND OF THE INVENTION

One computer implemented approach for calculating a demand forecast involves defining a so-called demand forecast tree capable of being graphically represented by a single top level node with at least two branches directly emanating therefrom, each branch having at least one further node. The demand forecast is computed on the basis of historical sales data typically associated with bottom level nodes of a demand forecast tree by a forecast engine capable of determining a mathematical simulation model for a demand process. One such forecast engine employing statistical seasonal causal time series models of count data is commercially available from Demantra Ltd, Israel, under the name Demantra™ Demand Planner.

Demand forecast applications include determining the optimal draw matrix D* to maximize the expected total profit (ETP) realizable by a distribution policy for a single period inventory system given by:

$$ETP = \sum_{ij} Ep(D_{ij}) = \sum_{ij} [ \qquad \text{Eqn. (1)}$$
$$(p_{ij} - c_{ij})D_{ij} - (p_{ij} - g_{ij})ER(\lambda_{ij}, D_{ij}) - b_{ij}EST(\lambda_{ij}, D_{ij})]$$

where $p_{ij}$ is the unit retail price of an $i^{th}$ consumer item at a $j^{th}$ location of the single period inventory system, $c_{ij}$ is its unit production cost, $g_{ij}$ is its unit return cost when unsold, and $b_{ij}$ is its unit stockout cost. Derived from Eqn. (1), the optimal draw matrix D* for a single period inventory system is calculated using optimal availabilities $A_{ij}^*$ where:

$$A_{ij}^* = F(\lambda_{ij}, D_{ij}^*) = \frac{p_{ij} - c_{ij} + b_{ij}}{p_{ij} - g_{ij} + b_{ij}}. \qquad \text{Eqn. (2)}$$

In the case of the above-mentioned "newsvendor" and the "knapsack" problems, Eqn. (1) respectively degenerates to:

$$ETP = \sum_j EP_j = \sum_j [(p_j - c_j)D_j - (p_j - g_j)ER(\lambda_j, D_j) - b_j EST(\lambda_j, D_j)]$$

and $$ETP = \sum_i EP_i = \sum_i [(p_i - c_i)D_i - (p_i - g_i)ER(\lambda_i, D_i) - b_i EST(\lambda_i, D_i)].$$

A distribution policy for a single period inventory system is often subject to one or more deterministic metric constraints, for example, a maximum total draw, a maximum budget, and the like, which necessitate an optimal constrained draw matrix denoted D^ whose total draw is typically less than the total draw of the optimal draw matrix D*. Two common approaches for solving such types of problems in the field of single-period inventory systems are the Lagrange multiplier approach as described in Silver, E., D. Pyke, and R. Peterson: *Inventory Management and Production Planning and Scheduling*, 3d ed., Wiley, NY, 1998, pgs. 406-422, and the one-by-one allocation or removal of draw units as discussed in Hadley, G., and T. M. Whitin, *Analysis of Inventory Systems*, Prentice-Hall, 1963, pgs. 304-307, the contents of which are incorporated herein by reference.

SUMMARY OF THE INVENTION

Broadly speaking, the present invention provides a novel computer implemented system for determining the most profitable distribution policy for a single period inventory system subject to a stochastic metric constraint which reflects a marketing objective as opposed to a hitherto deterministic metric constraint which reflects a production or a budgetary objective, optimization application therefor, and method therefor. The computer implemented system may also include a computer implemented Decision Support Tool for facilitating user determination of a distribution policy for a single period inventory system.

A first preferred stochastic metric constraint in accordance with the present invention is a minimum threshold imposed on the expected weighted total sales $ES(\lambda, D)$ (hereinafter referred to "sales target") of a distribution policy for a single period inventory system. The optimal constrained draw matrix D^ for the single period inventory system is required to satisfy the condition $ES(\lambda, D\hat{}) \geq G$ for some pre-determined threshold G. In the case that the optimal draw D* does not satisfy the sales target G, namely, $ES(\lambda, D^*) < G$, the total draw of the optimal constrained draw matrix D^ is greater than the total draw of the optimal draw matrix D*.

A second preferred stochastic metric constraint in accordance with the present invention is a maximum threshold imposed on the expected weighted total stockouts $EST(\lambda, D)$ (hereinafter referred to "stockout constraint") of a distribution policy for a single period inventory system. The optimal constrained draw matrix D^ for the single period inventory system is required to satisfy the condition $EST(\lambda, D\hat{}) \leq H$ for some pre-determined threshold H. In the case that the optimal draw D* does not satisfy the stockout constraint H, namely, that $EST(\lambda, D^*) > H$, the total draw of the optimal constrained draw matrix D^ is also greater than the total draw of the optimal draw matrix D*.

A third preferred stochastic metric constraint in accordance with the present invention is a maximum threshold imposed on the expected weighted total returns $ER(\lambda, D)$ (hereinafter referred to as "returns constraint") for example, to comply with compulsory regulations, of a distribution policy for a single period inventory system. The optimal constrained draw matrix D^ for the single period inventory system is required to satisfy the condition $ER(\lambda,D^\wedge) \leq V$ for some pre-determined threshold V. In the case that the optimal draw D* does not satisfy the returns constraint V, namely, $ER(\lambda,D^*) > V$, the total draw of the optimal constrained draw matrix D^ is less than the total draw of the optimal draw matrix D*.

The optimal constrained draw matrix D^ for a single period inventory system subject to any of the above three stochastic metric constraints may be iteratively arrived at using the Lagrange multiplier approach. The Lagrange systems of equations to be numerically solved for determining the most profitable distribution policy for the three different stochastic metric constraints are derived hereinbelow from Eqn. (1) using the following notation: In the case of the sales target G, $L(D_{ij}) = \Sigma w_{ij}(D_{ij} - ER(\lambda_{ij},D_{ij})) - G$, in the case of the stockout constraint H, $L(D_{ij}) = \Sigma w_{ij} EST(\lambda_{ij},D_{ij}) - H$, and in the case of the returns constraint V, $L(D_{ij}) = \Sigma w_{ij} ER(\lambda_{ij},D_{ij}) - V$.

Introducing the Lagrange multiplier M, the following functions have to be differentiated with respect to $D_{ij}$ and M:

$$Z(D_{ij}, M) = EP(D_{ij}) + M \cdot L(D_{ij}) \text{ for each } ij$$

Noting that $$\frac{\partial_{ij}}{\partial D_{ij}} ER(\lambda_{ij}, D_{ij}) = F(\lambda_{ij}, D_{ij}) \text{ and}$$

$$\frac{\partial_{ij}}{\partial D_{ij}} EST(\lambda_{ij}, D_{ij}) = F(\lambda_{ij}, D_{ij}) - 1$$

where F is the cdf of demand, then:

$$\frac{\partial_{ij}}{\partial D_{ij}} EP(D_{ij}) = p_{ij} - c_{ij} - (p_{ij} - g_{ij})F(\lambda_{ij}, D_{ij}) - b_{ij}(F(\lambda_{ij}, D_{ij}) - 1)$$

$$= p_{ij} - c_{ij} + b_{ij} - (p_{ij} - g_{ij} + b_{ij})F(\lambda_{ij}, D_{ij}) \text{ for each } i, j$$

The second term in Z differentiates with respect to $D_{ij}$ in the case of the sales target G to $Mw_{ij}(1 - F(\lambda_{ij},D_{ij}))$, in the case of the stockout constraint H to $Mw_{ij}(F(\lambda_{ij},D_{ij}) - 1)$, and in the case of the returns constraint V to $Mw_{ij}(F(\lambda_{ij},D_{ij}))$. The derivatives in Z with respect to M equal $L(D_{ij})$ in all three cases. Equating the derivative to 0 in each case, in the case of the sales target G, $$F(\lambda_{ij}, D_{ij}) = \frac{p_{ij} - c_{ij} + b_{ij} + Mw_{ij}}{p_{ij} - g_{ij} + b_{ij} + Mw_{ij}} \text{ for all } i, j$$

whilst in the case of the stockout constraint H, $$F(\lambda_{ij}, D_{ij}) = \frac{p_{ij} - c_{ij} + b_{ij} - Mw_{ij}}{p_{ij} - g_{ij} + b_{ij} - Mw_{ij}} \text{ for all } i, j$$

whilst in the case of the returns constraint V, $$F(\lambda_{ij}, D_{ij}) = \frac{p_{ij} - c_{ij} + b_{ij}}{p_{ij} - g_{ij} + b_{ij} - Mw_{ij}} \text{ for all } i, j$$

To determine the optimal constrained draw matrix D^, these equations have to be solved along with their respective Lagrange adjoints $L(D_{ij}) = 0$ as follows:

$$\Sigma w_{ij}(D_{ij} - ER(\lambda_{ij},D_{ij})) = G \quad (1)$$

$$\Sigma w_{ij} EST(\lambda_{ij},D_{ij}) = H \quad (2)$$

$$\Sigma w_{ij} ER(\lambda_{ij},D_{ij}) = V \quad (3)$$

Alternatively, the optimal constrained draw matrix D^ in the case of either the sales target G or the stockout constraint H may be arrived by the one-by-one allocation of additional draw units to the draws $D_{ij}^*$ of $i^{th}$ $j^{th}$ item-locations of a single period inventory system as determined by the most profitable distribution policy therefor in the event that D* does not satisfy the sales target or the stockout constraint respectively Each additional draw unit is allocated so as to result in the least decrease in the expected total profit attributable thereto. Conversely, the optimal constrained draw matrix D^ in the case of the returns constraint V may be arrived by the one-by-one removal of draw units from the draws $D_{ij}^*$ of $i^{th}$ $j^{th}$ item-locations of a single period inventory system as determined by the most profitable distribution policy therefor in the event that D* does not satisfy the returns constraint. Each removed draw unit is also removed so as to result in the least decrease in the expected total profit attributable thereto.

BRIEF DESCRIPTION OF THE DRAWINGS

In order to better understand the invention and to see how it can be carried out in practice, preferred embodiments will now be described, by way of non-limiting examples only, with reference to the accompanying drawings in which:

FIG. 10 is a table summarizing the results of the iterations according to the Lagrange multiplier approach for meeting a sales target G-=72 newspaper copies in the event of a mean demand vector), $\lambda$=(10,21,42);

FIG. 11 is a table summarizing the results of the iterations according to the one-by-one allocation of additional draw units approach for meeting a sales target G=72 newspaper copies in the event of a mean demand vector $\lambda$=(10,21,42)

DETAILED DESCRIPTION OF THE PREFERRED EMBODIMENTS

Figure 1:
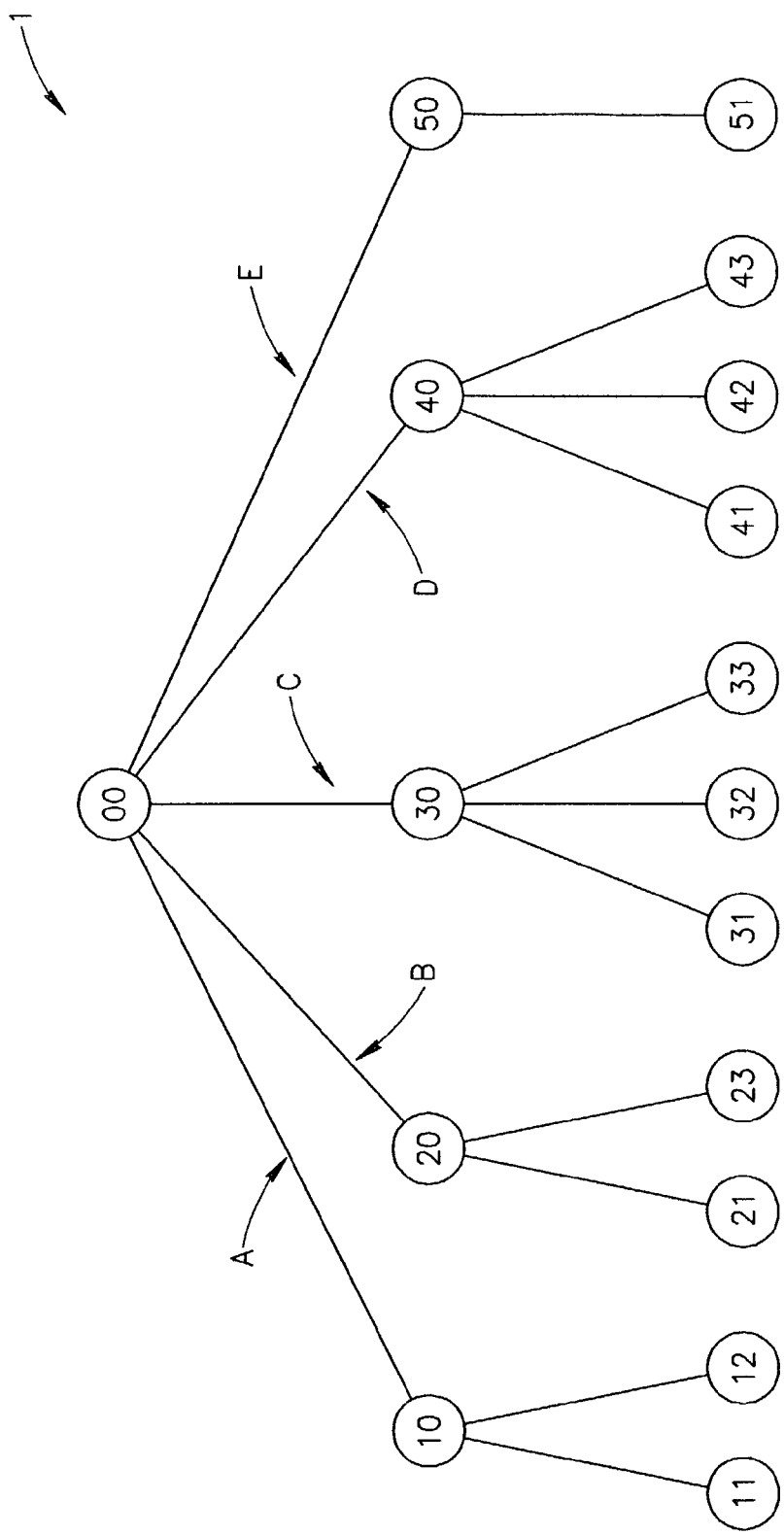
FIG. 1 is a pictorial representation showing a demand forecast tree for calculating demand forecast information for five different consumer items.
Figure 2:
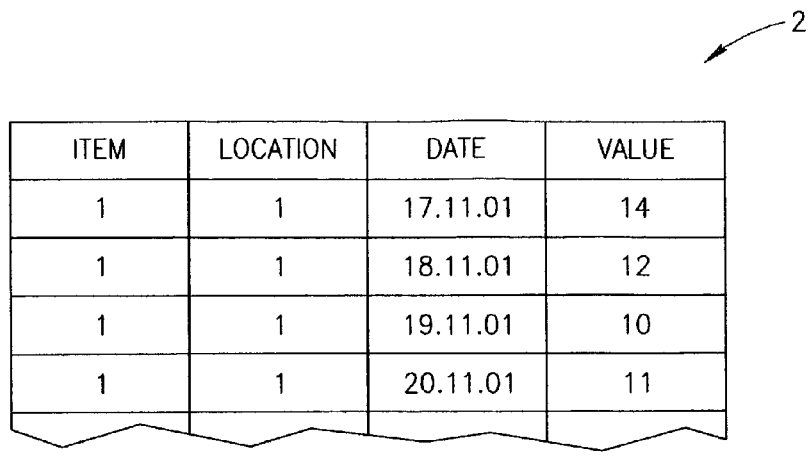
FIG. 2 is a table showing historical sales data associated with the demand forecast tree of FIG. 1.

FIG. 1 shows an exemplary demand forecast tree 1 having a single top level node (00) with five branches A, B, C, D and E for correspondingly representing the sale of Item I (top level-1 node (10)) at Locations 1 and 2 (bottom level nodes (11) and (21)), Item II (top level-1 node (20)) at Locations 1 and 3 (bottom level nodes (21) and (23)), Item III (top level-1 node (30)) at Location 1, 2 and 3 (bottom level nodes (31), (32) and (33)), Item IV (top level-1 node (40)) also at Locations 1, 2 and 3 (bottom level nodes (41), (42) and (43)); and Item V (top level-1 node (50)) at Location 1 (bottom level node (51)) only. FIG. 2 shows an exemplary table 2 containing historical sales data for Item I at the bottom level nodes (11) and (12). Similar tables exist for the sale of the other items at their respective locations.

Figure 3:
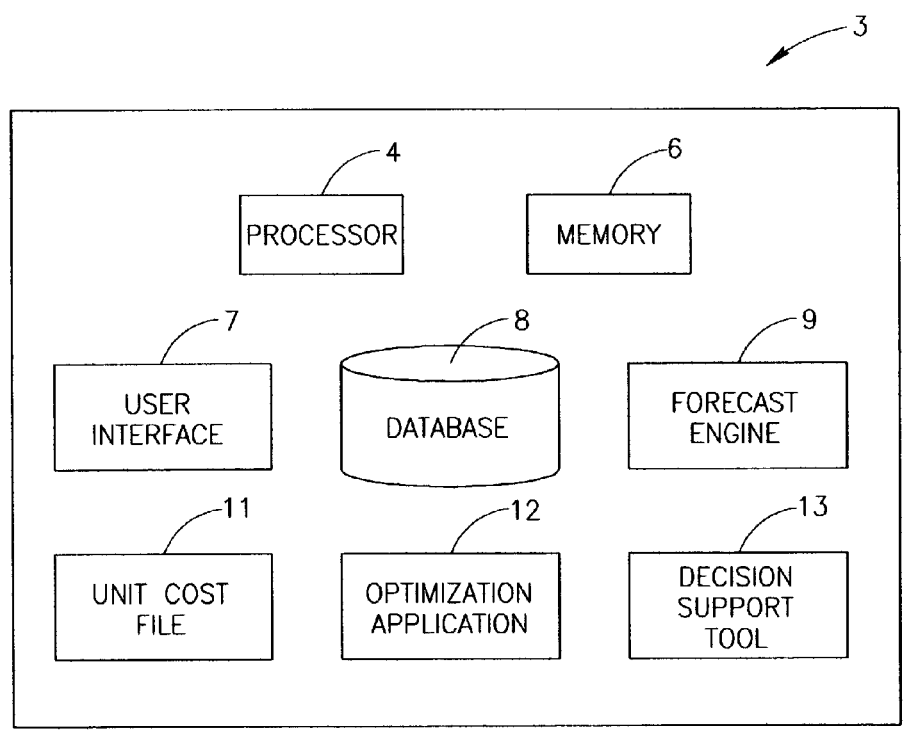
FIG. 3 is a block diagram of a computer implemented system for determining the most profitable distribution policy for a single period inventory system subject to a stochastic metric constraint, and including a Decision Support Tool for facilitating user determination of a distribution policy for a single period inventory system.

FIG. 3 shows a computer implemented system 3 with a processor 4, memory 6, a user interface 7 including suitable input devices, for example, a keypad, a mouse, and the like, and output means, for example, a screen, a printer, and the like, with other computer components for enabling operation of the system including result analysis. The computer implemented system 3 includes a database 8 for storing historical time series of sales information of items at locations, a forecast engine 9 for forecasting the mean demand $\lambda_{ij}$ for each $i^{th}$ consumer item at each $j^{th}$ location on the basis of the historical sales data, a unit cost file 11 for storing the unit retail price $p_{ij}$, the unit production cost $c_{ij}$, the unit return cost $g_{ij}$, and the unit stockout cost $b_{ij}$ of each it consumer item at each $j^{th}$ location of the single period inventory system; and an optimization application 12 for receiving a threshold for the expected value of a stochastic metric constraint imposed on a single period inventory system, and for determining the optimal constrained draw matrix D^ for the most profitable distribution policy for the single period inventory system subject to the constraint. The computer implemented system 3 also includes a Decision Support Tool (DST) 13 for facilitating user determination of a distribution policy for a single period inventory system. The forecast engine 9 may be implemented and managed as illustrated and described in commonly assigned co-pending U.S. patent application Ser. No. 10/058,830 entitled "*Computer Implemented Method and System for Demand Forecast Applications*", the contents are which are incorporated herein by reference. Whilst the present invention is being described in the context of a fully functional computer implemented system, it is capable of being distributed as a program product in a variety of forms, and the present invention applies equally regardless of the particular type of signal bearing media used to carry out distribution. Examples of such media include recordable type media e.g. CD ROM and transmission type media e.g. digital communication links.

The present invention will now be exemplified for an exemplary "newsvendor" problem for determining the most profitable distribution policy for a single period inventory system having three locations, namely, j=1, 2 and 3 for the sale of newspapers under a stochastic metric constraint. Assuming that $p_j$=US$0.50, $b_j$=$c_j$=US$0.25, and $g_j$=US$0.00 for all j throughout the single period newspaper inventory system, the optimal common availability A* for the most profitable distribution policy therefor using Eqn. (2) is given by:

$$A^*=(0.5-0.25+0.25)/(0.5+0.25)=0.5/0.75=66.7\%.$$

Assuming that the demand for newspapers at all locations has a Poisson probability distribution, and the mean demand for a given day is forecasted to be the vector $\lambda$=(10, 21, 42), then consequently, the optimal draw vector D* for the most profitable distribution policy for that day is D*=(11, 23, 45), namely, a total draw of 79 copies. Using the expressions $ES(\lambda_j,D_j)=D_j-ER(\lambda_j,D_j)$ where $ER(\lambda_j,D_j)=D_jf(\lambda_j,D_j-1)+(D_j-\lambda_j)F(\lambda_j,D_j-2)$ for the assumed Poisson distribution of demand, and $EST(\lambda_j,D_j)=\lambda_j-ES(\lambda_j,D_j)$, the expected sales quantities for the single period newspaper inventory system are 9.2, 20.0 and 40.6 at the locations j=1, 2 and 3, respectively, whilst the expected returns thereat are 1.8, 3.0 and 4.4 respectively, whilst the expected stockouts thereat are 0.8, 1.0 and 1.4 respectively. To summarize, the most profitable distribution policy for the single period newspaper inventory system leads to an expected total sales quantity of 9.2+20.0+40.6=69.8 newspaper copies out of a total draw of 79 newspaper copies, expected total returns of 9.2 newspaper copies, and expected total stockout of 3.2 newspaper copies.

Figure 4:
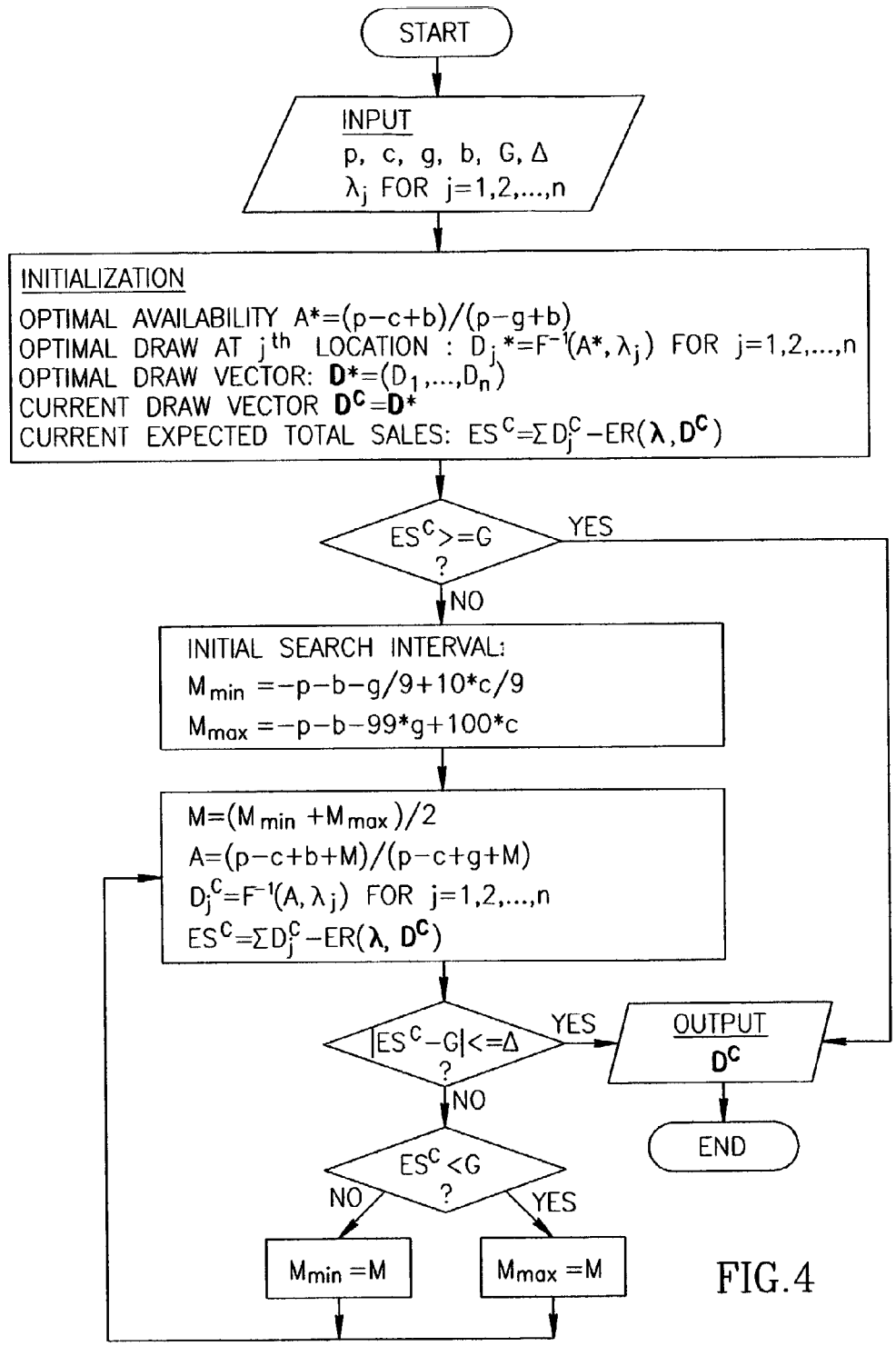
FIG. 4 is a flow chart for determining the most profitable distribution policy to meet a sales target G for a single item, multi-location single period inventory system in accordance with the Lagrange multiplier approach.
Figure 5:
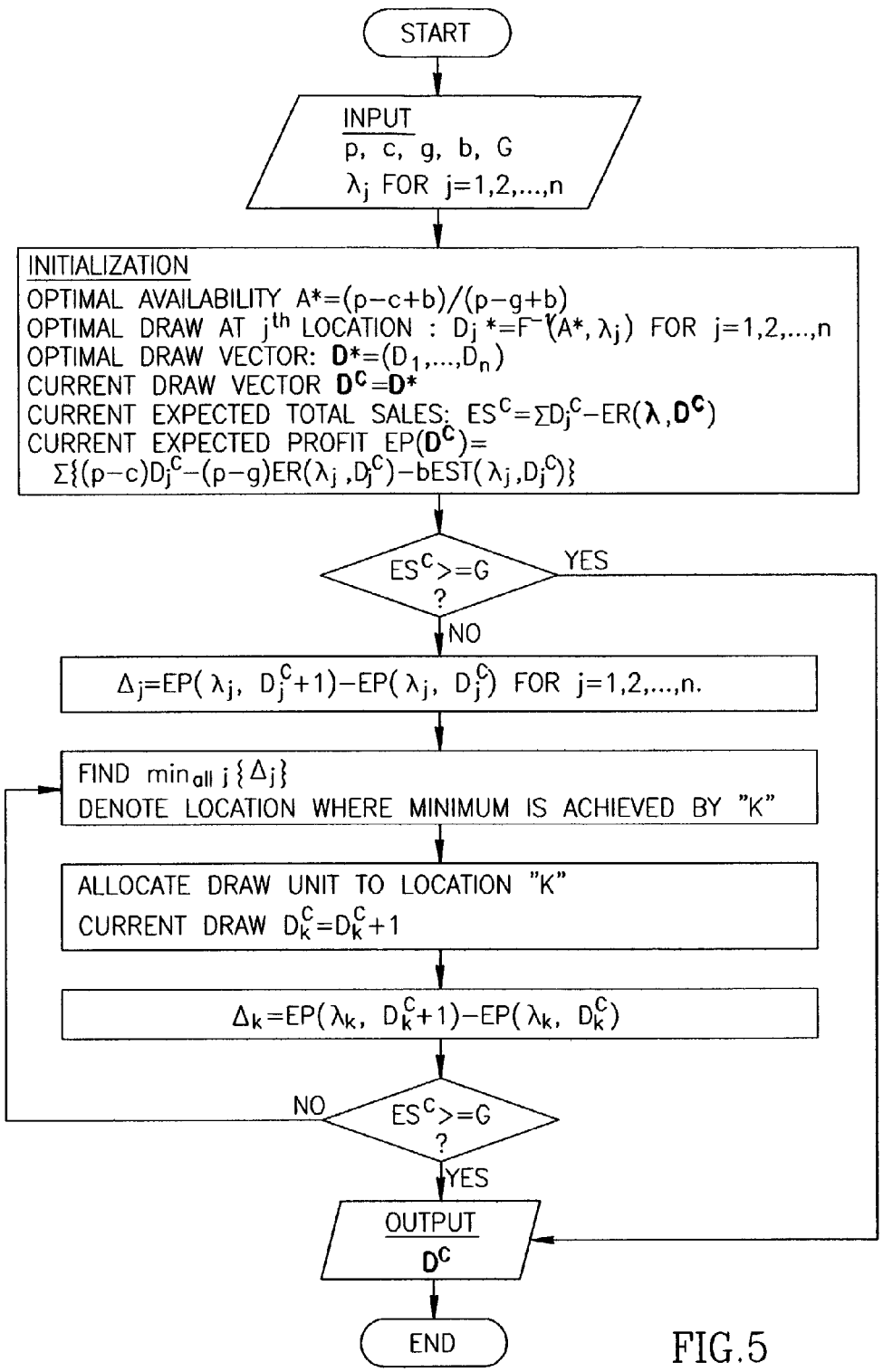
FIG. 5 is a flow chart for determining the most profitable distribution policy to meet a sales target G for a single item, multi-location single period inventory system in accordance with the one-by-one allocation of additional draw units approach.
Figure 6:
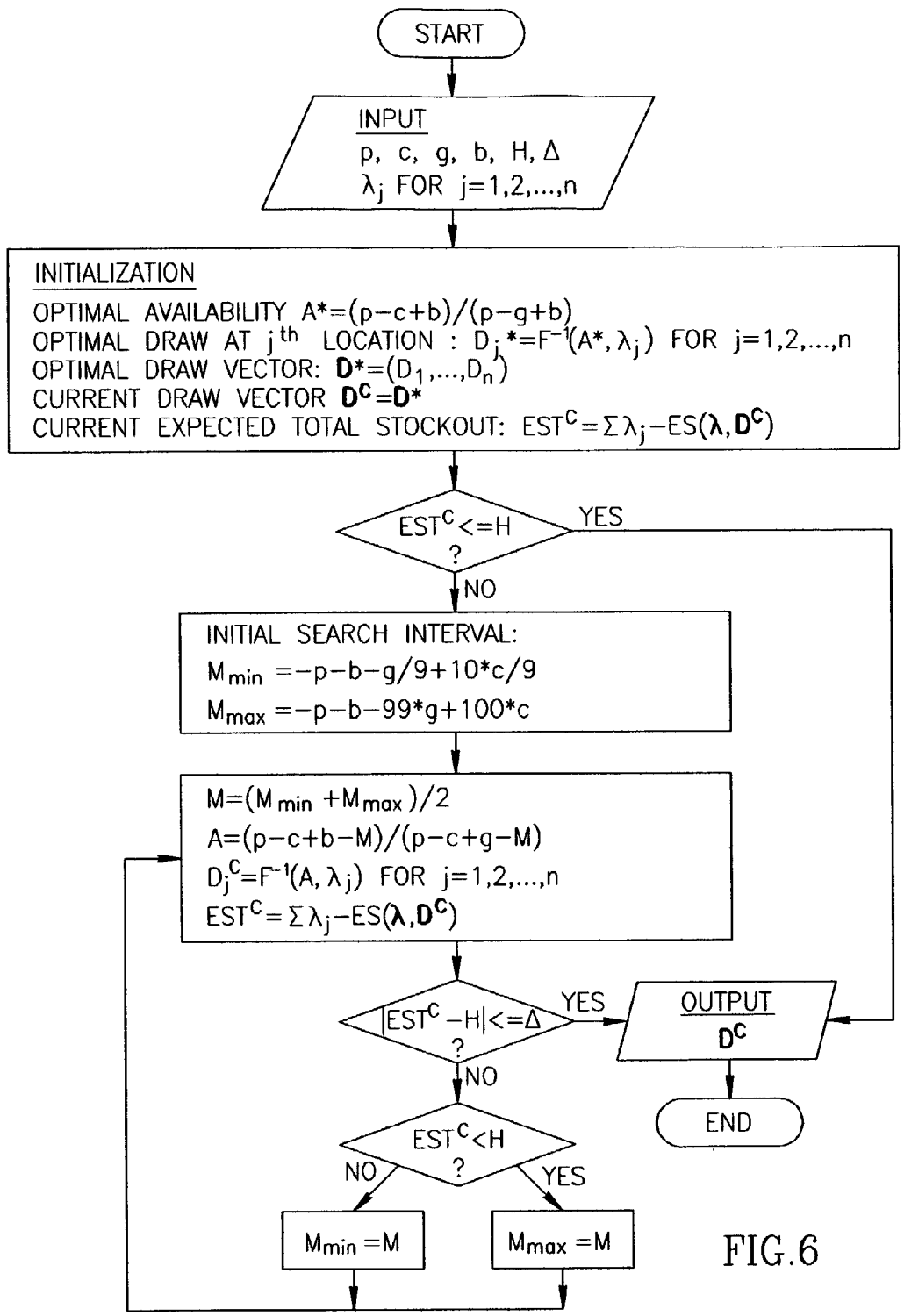
FIG. 6 is a flow chart for determining the most profitable distribution policy to meet a stockout constraint H for a single item, multi-location single period inventory system in accordance with the Lagrange multiplier approach.
Figure 7:
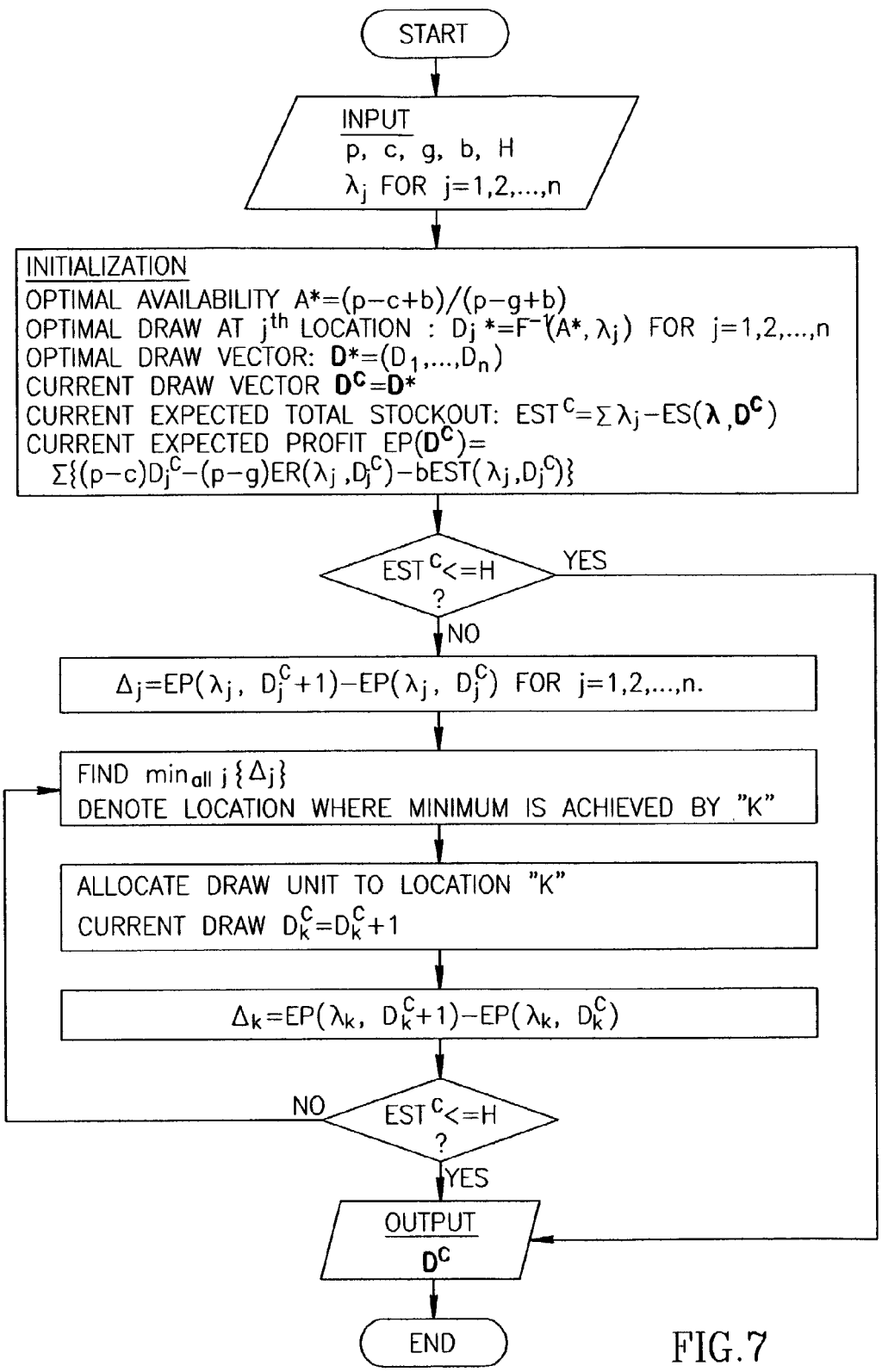
FIG. 7 is a flow chart for determining the most profitable distribution policy to meet a stockout constraint H for a single item, multi-location single period inventory system in accordance with the one-by-one allocation of additional draw units approach.
Figure 8:
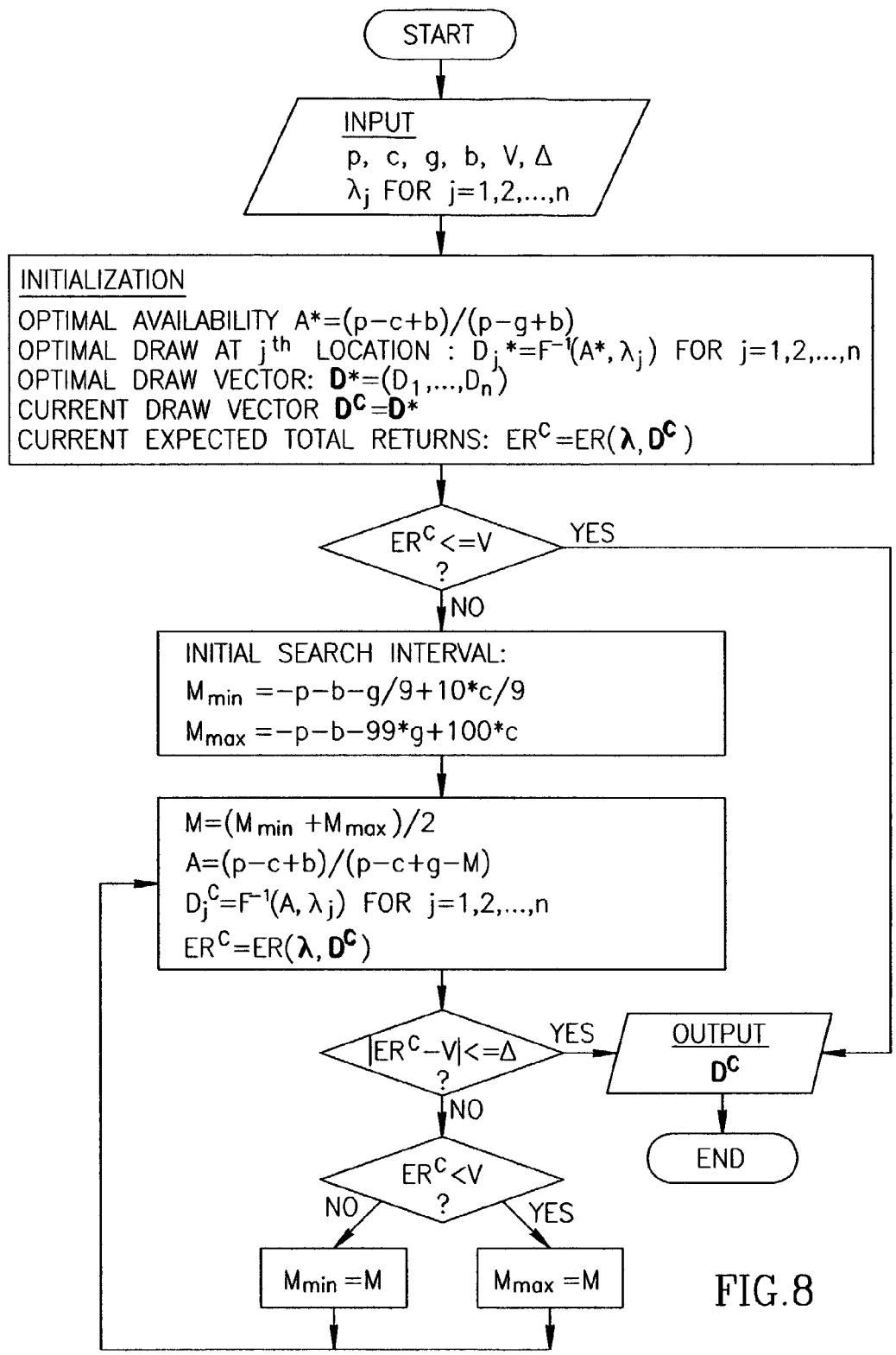
FIG. 8 is a flow chart for determining the most profitable distribution policy to meet a returns constraint V for a single item, multi-location single period inventory system in accordance with the Lagrange multiplier approach.
Figure 9:
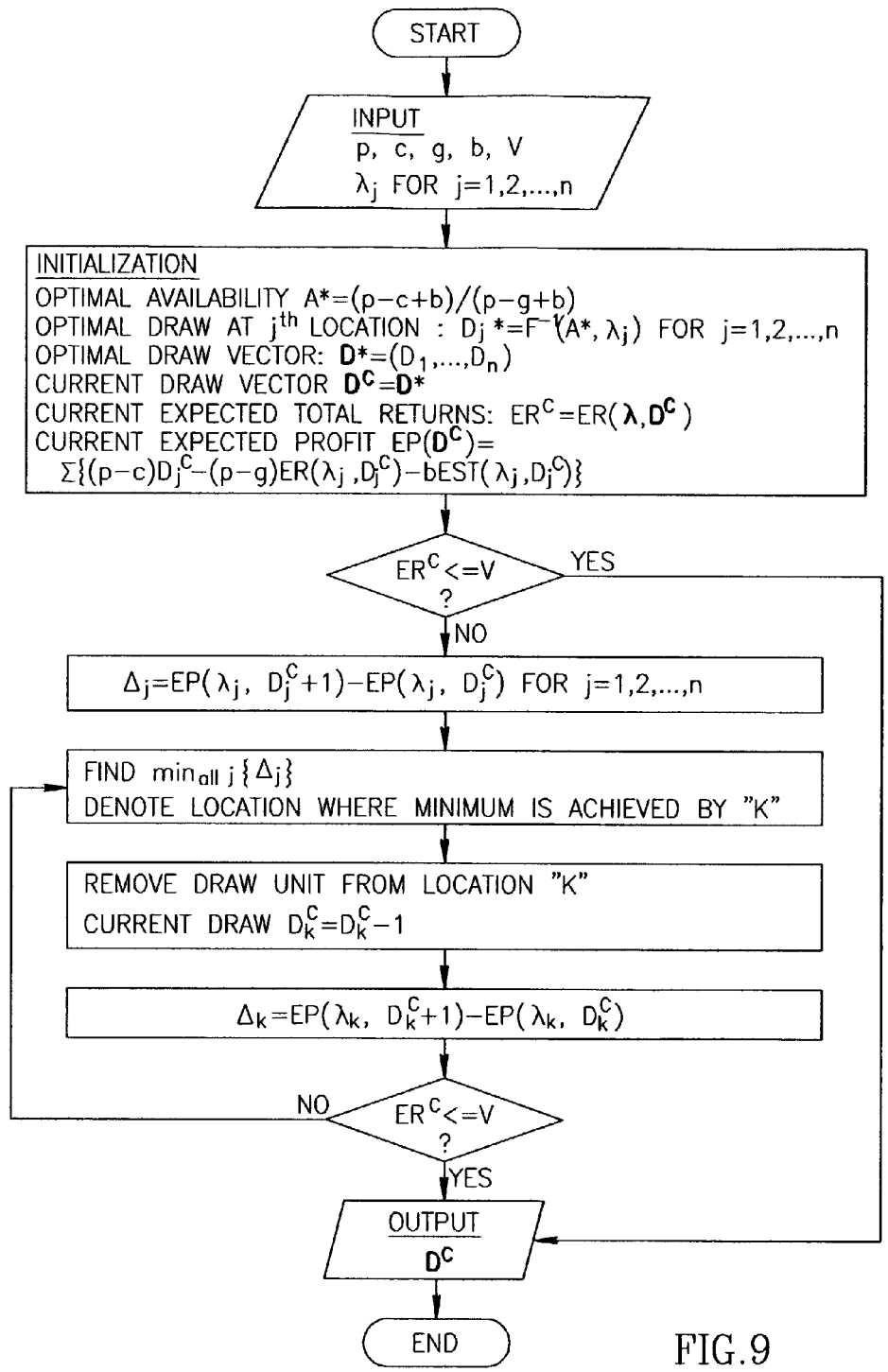
FIG. 9 is a flow chart for determining the most profitable distribution policy to meet a returns constraint V for a single item, multi-location single period inventory system in accordance with the one-by-one removal of draw units approach.

The optimization application 12 can be programmed to determine the optimal constrained draw vector D^ for the single period newspaper inventory system to meet a user set sales target G within a user set predetermined tolerance $\Delta$ using either a Lagrange multiplier approach (see FIG. 4) or an one-by-one allocation of additional newspaper copies approach (see FIG. 5). Alternatively, the optimization application 12 can be programmed to determine the optimal constrained draw vector D^ for the single period newspaper inventory system to meet a user set stockout constraint H within a user set predetermined tolerance $\Delta$ using either a Lagrange multiplier approach (see FIG. 6) or an one-by-one allocation of additional newspaper copies approach (see FIG. 7). Alternatively, the optimization application 12 can be programmed to determine the optimal constrained draw vector D^ for the single period newspaper inventory system to meet a user set returns constraint H within a user set predetermined tolerance $\Delta$ using either a Lagrange multiplier approach (see FIG. 8) or an one-by-one allocation of additional newspaper copies approach (see FIG. 9).

To determine the optimal constrained draw matrix D^ to meet the sales target G of, say, 72 newspaper copies, using the Lagrange multiplier approach, on substitution of the relevant costs from the unit cost file 9, the optimization application 12 solves the following Lagrange system of equations to meet a sales target G=72 with a predetermined tolerance Δ=0.10:

$$F(\lambda_j D_j^\wedge) = \frac{0.5 + M}{0.75 + M} \text{ for } j = 1,2 \text{ and } 3, \text{ and } ES(\lambda, D^\wedge) = 72$$

The optimization application 12 uses the binary search method for finding the next Lagrange multiplier M with the initial value of the Lagrange multiplier M set to be the midpoint between the two values of M obtained by assigning the near extreme values 0.1 and 0.99 to the common availability A. To determine the optimal constrained draw matrix $D^\wedge$ to meet a sales target G=72 using the one-by-one additional allocation approach, on substitution of the relevant costs from the unit cost file 11, the optimization application 12 calculates the decrease in the expected total profit due to the allocation of an additional draw unit to each location j=1, 2, and 3 in accordance with the expression ETP=Σ(0.25$D_j$−0.5ER($\lambda_j$,$D_j$)−0.25EST($\lambda_j$,$D_j$)) where ER($\lambda_j$,$D_j$)=$D_j$f($\lambda_j$,$D_j$−1)+($D_j$−$\lambda_j$)F($\lambda_j$,$D_j$−2) due to the assumed Poisson distribution of demand and EST($\lambda_j$,$D_j$)= $\lambda_j$−$D_j$+ER($\lambda_j$,$D_j$).

The optimization application 12 takes six iterations to arrive at the optimal constrained draw vector $D^\wedge$=(14, 26, 50) using the Lagrange multiplier approach (see FIG. 10) and ten iterations to arrive at the optimal constrained draw vector $D^\wedge$=(14, 26, 49) using the one-by-one allocation of additional newspaper copies approach (see FIG. 11). In FIG. 11, the winning location of each additional draw unit is designated by its incremental profit being highlighted in bold. In the present case, the latter approach requires more steps than the former approach for arriving at its optimal constrained draw vector $D^\wedge$ but it achieves the required sales target with one less newspaper copy which can be representative of considerable savings for a large single period newspaper inventory system delivering, say, two million newspaper copies daily. This saving of a newspaper copy is achieved by virtue of the one-by-one allocation repeatedly assigning units to locations to reach the objective of maximum total profit with minimum draws until the constraint is satisfied leading to locations having potentially considerably different availabilities whilst against this, the Lagrange multiplier approach is based on repeatedly calculating common location availabilities for determining draws until the constraint is satisfied.

The optimization application 12 can determine the optimal constrained draw matrix $D^\wedge$ to meet a stockout constraint H of, say, 2.5 newspaper copies, or a returns constraint V of, say, 8.5 newspaper copies in a similar manner as described hereinabove for meeting the sales target G of 72 newspaper copies.

Figure 12:
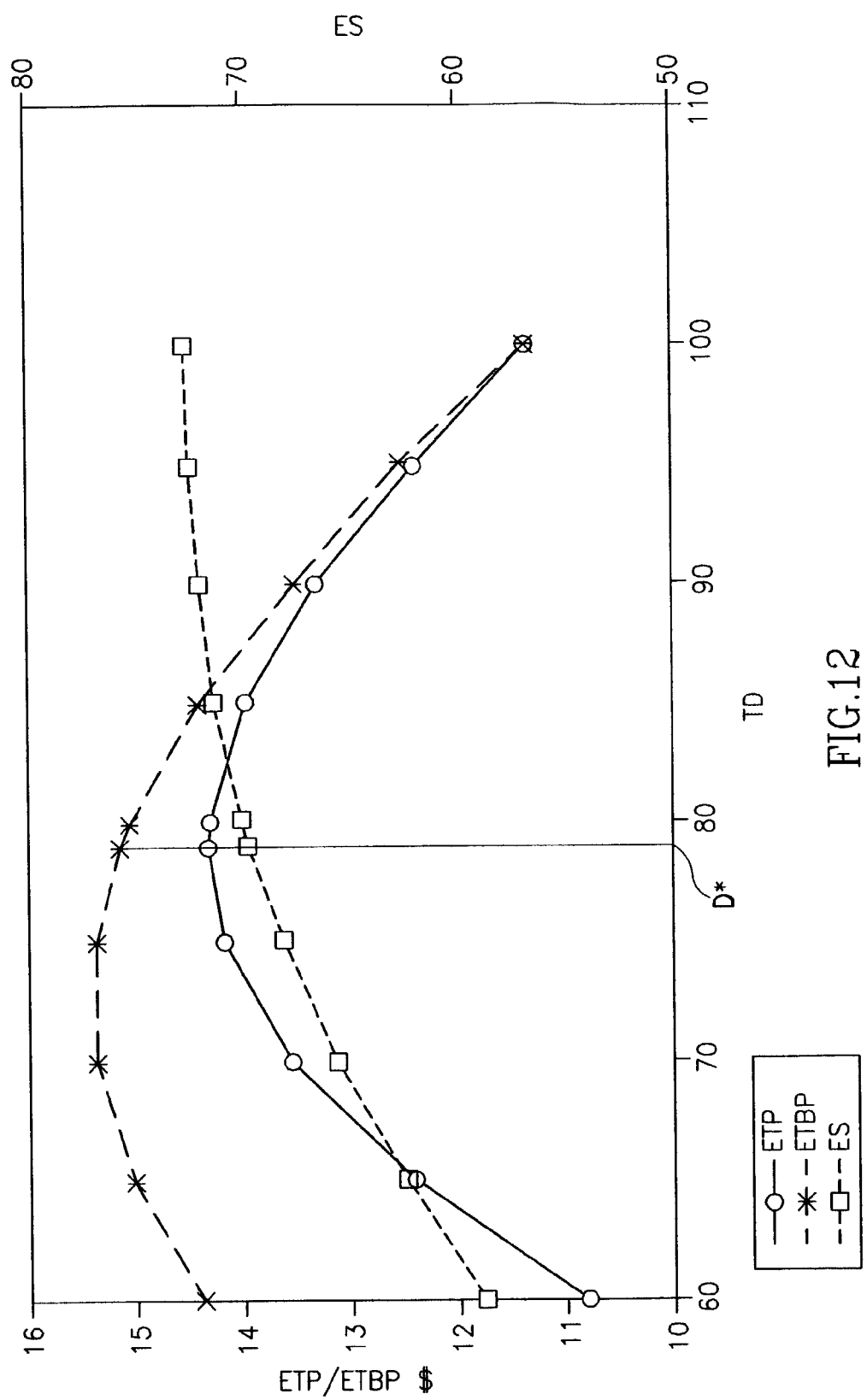
FIG. 12 is a graph showing plots of the Decision Support Tool of the present invention for facilitating user determination of a distribution policy for a single item, multi-location single period inventory system.

FIG. 12 shows the operation of the Decision Support Tool 13 for graphically plotting the expected total sales ES and the expected total profit ETP for a range of total draws centered around the total draw of 79 newspaper copies of the most profitable distribution policy for the present newspaper single period inventory system. The draw vectors D for different total draw values between 60 and 100 in intervals of 5 newspaper copies are preferably arrived at by one-by-one allocation of newspaper copies to the optimal draw vector D* for total draws greater than 79, and removal of draw units therefrom for total draws less than 79. The values of the stochastic metrics ES and ETP at the different total draw values are respectively given by ES(λ,D)=TD−ER(λ, D), and ETP(λ,D)=0.25TD−0.50ER(λ,D)−0.25EST(λ,D) on substitution of the above costs $p_j$=US$0.50, $b_j$=$c_j$=US$0.25, and $g_j$=US$0.00, from the unit cost file 11, and thereafter the ES and ETP plots are interpolated between the calculated values.

In addition to and/or instead of plotting the expected total profit ETP, the Decision Support Tool 13 can graphically plot the expected total bookkeeping profit ETBP defined as being equal to the expected total profit ETP but excluding stockout losses which are opportunity losses as opposed to actual bookkeeping revenues and expenses. Therefore, in the present single period newspaper inventory system, ETBP(λ, D)=0.25TD−0.5ER(λ,D) on substitution of the above costs $p_j$=US$0.50, $b_j$=$c_j$=US$0.25, and $g_j$=US$0.00. As shown, the maximal ETBP value is both higher than the maximal ETP value, and occurs at a smaller total draw by virtue of it excluding stockout losses.

One use of the Decision Support Tool 13 will now be described with reference to the following table with values obtained from FIG. 12:

| TD | ES | ETP Reduction | ETBP Reduction |
|---|---|---|---|
| 79 | 69.8 | — | — |
| 84 | 71 | 0.25 | 0.45 |
| 89 | 72 | 0.85 | 1.30 |

The sales target G of 72 newspaper copies leads to an ETP reduction of about US$0.85 and an ETBP reduction of US$1.30 compared to the most profitable distribution policy. These reductions may be considered as being too great, and therefore a user may use the plots to settle for a lower sales target of, say, 71 newspaper copies leading to smaller ETP and ETBP reductions of US$0.25 and US$0.45, respectively, compared to the most profitable distribution policy.

Another use of the Decision Support Tool 13 is to enable a user to determine a distribution policy for a single period inventory system subject to different total draw constraints. For example, the Decision Support Tool 13 graphically shows that it is more profitable to deliver a total draw of 75 newspaper copies as opposed to 85 newspaper copies, the former and latter constraints leading to ETP reductions of about US$0.14 and US$0.35, respectively.

While the invention has been described with respect to a limited number of embodiments, it will be appreciated that many variations, modifications, and other applications of the invention can be made within the scope of the appended claims.

The invention claimed is:

1. Computer implemented system for determining the most profitable distribution policy for a single period inventory system subject to a stochastic metric constraint, the system comprising:
   (a) a database for storing historical sales data of sales information of each $i^{th}$ consumer item where I=1, 2, ..., m at each $j^{th}$ location where j=1, 2, ..., n of the single period inventory system;
   (b) a forecast engine for forecasting the mean demand $\lambda_{ij}$ of each $i^{th}$ consumer item at each $j^{th}$ location of the single period inventory system on the basis of the historical sales data;
   (c) a unit cost file for storing the unit retail price $p_{ij}$, the unit production cost $c_{ij}$, the unit return cost $g_{ij}$, and the unit stockout cost $b_{ij}$ of each $i^{th}$ consumer item at each $j^{th}$ location of the single period inventory system; and (d) an optimization application for receiving a threshold for the stochastic metric constraint imposed on the single period inventory system, and determining the optimal constrained draw matrix D^ for the most profitable distribution policy for the single period inventory system satisfying the threshold, wherein the stochastic metric constraint is a sales target $ES(\lambda, D^*) \geq G$ for some pre-determined threshold G; and wherein, in the case that $ES(\lambda, D) < G$, said optimization application numerically solves the Lagrange system of equations:

$$F(\lambda_{ij}, D_{ij}) = \frac{p_{ij} - c_{ij} + b_{ij} + Mw_{ij}}{p_{ij} - g_{ij} + b_{ij} + Mw_{ij}} \text{ for all } i, j$$

and $$\sum_{ij} w_{ij}(D_{ij} - ER(\lambda_{ij}, D_{ij})) = G$$

for determining the optimal constrained draw matrix D^.

2. The system according to claim 1 wherein, in the case that $ES(\lambda, D^*) < G$, said optimization application repeatedly allocates additional draw units one-by-one to draws of $D_{ij}$ of $i^{th} j^{th}$ item-locations of the single period inventory system for determining the optimal constrained draw matrix D^, each additional draw unit being allocated so as to result in the least decrease in the expected total profit attributable thereto.

3. The system according to claim 2 wherein said optimization application initiates the allocation procedure from the optimal draw matrix D* for the single period inventory system.

4. The system according to claim 1 wherein the stochastic metric constraint is a stockout constraint $EST(\lambda, D^*) \leq H$ for some predetermined threshold H.

5. The system according to claim 4 wherein, in the case that $EST(\lambda, D^*) > H$, said optimization application numerically solves the Lagrange system of equations:

$$F(\lambda_{ij}, D_{ij}) = \frac{p_{ij} - c_{ij} + b_{ij} - Mw_{ij}}{p_{ij} - g_{ij} + b_{ij} - Mw_{ij}} \text{ for all } i, j$$

and $$\sum_{ij} w_{ij} EST(\lambda_{ij}, D_{ij}) = H$$

for determining the optimal constrained draw matrix D^.

6. The system according to claim 4 wherein, in the case that $EST(\lambda, D^*) > H$, said optimization application repeatedly allocates additional draw units one-by-one to draws $D_{ij}$ of $i^{th} j^{th}$ item-locations of the single period inventory system for determining the optimal constrained draw matrix D^, each additional draw unit being allocated so as to result in the roast decrease in the expected total profit attributable thereto.

7. The system according to claim 6 wherein said optimization application initiates the allocation procedure from the optimal draw matrix D* for the single period inventory system.

8. The system according to claim 1 wherein th stochastic metric constraint is a returns constraint $ER(\lambda, D^\wedge) < V$ for some predetermined threshold V.

9. The system according to claim 8 wherein, in the case that $ER(\lambda, D^*) > V$, said optimization application numerically solves the Lagrange system of equations:

$$F(\lambda_{ij}, D_{ij}) = \frac{p_{ij} - c_{ij} + b_{ij}}{p_{ij} - g_{ij} + b_{ij} - Mw_{ij}} \text{ for all } i, j$$

and $$\sum_{ij} w_{ij} ER(\lambda_{ij}, D_{ij})) = V$$

for determining the optimal constrained draw matrix D^.

10. The system according to claim 8 wherein, in the case that $ER(\lambda, D^*) > V$, said optimization application repeatedly removes draw units one-by-one from draws $D_{ij}$ of $i^{th} j^{th}$ item-locations of the single period inventory system for determining the optimal constrained draw matrix D^, each removed draw unit being selected so as to result in the least decrease in the expected total profit attributable thereto.

11. The system according to claim 10 wherein said optimization application initiates the removal procedure of draw units from the optimal draw matrix D* for the single period inventory system.

12. The system according to claim 1 wherein said optimization application communicates the expected values of at least one stochastic metric for at least two draws together with their associated expected total profit (ETP) and/or expected total bookkeeping profit (ETBP) respectively given by:

$$ETP = \sum_{ij} EP_{ij} = \sum_{ij} [(p_{ij} - c_{ij})D_{ij} - (p_{ij} - g_{ij})ER(\lambda_{ij}, D_{ij}) - b_{ij}EST(\lambda_{ij}, D_{ij})]$$

and $$ETBP = \sum_{ij} EBP_{ij} = \sum_{ij} [(p_{ij} - c_{ij})D_{ij} - (p_{ij} - g_{ij})ER(\lambda_{ij}, D_{ij})].$$

13. The system according to claim 12 wherein the at least one stochastic metric is one or more of the following: expected weighted total sales, expected weighted total stockout, and expected weighted total returns.

14. The system according to claim 1 wherein the consumer item is a printed media publication.

15. Optimization application operating on at least one computer for determining the most profitable distribution policy for a single period inventory system subject to a stochastic metric constraint wherein:

the optimization application is operable to receive a threshold for the stochastic metric constraint, wherein the stochastic metric constraint is a sales target $ES(\lambda, D^\wedge) > G$ for some pre- Mar. 14, 2007 determined threshold G, and the optimization application is operable to determine the optimal constrained draw matrix D^ for the most profitable distribution policy for the single period inventory system satisfying the threshold wherein in the ease that $ES(\lambda, D^*) < G$, is operable to numerically solve the Lagrange system of equations:

$$F(\lambda_{ij}, D_{ij}) = \frac{p_{ij} - c_{ij} + b_{ij} + Mw_{ij}}{p_{ij} - g_{ij} + b_{ij} + Mw_{ij}} \text{ for all } i, j$$

and $$\sum_{ij} w_{ij}(D_{ij} - ER(\lambda_{ij}, D_{ij})) = G$$

for determining the optimal constrained draw matrix D^.

16. The optimization application according to claim 15 and, in the case that $ES(\lambda, D^*)<G$, operable to repeatedly allocate additional draw units one-by-one to draws $D_{ij}$ of $i^{th}$ $j^{th}$ item-locations of the single period inventory system for determining the optimal constrained draw matrix D^, each additional draw unit being allocated so as to result in the least decrease in the expected total profit attributable thereto.

17. The optimization application according to claim 16 and operable to initiate the allocation procedure from the optimal draw matrix D* for the single period inventory system.

18. The optimization application according to claim 15 wherein the stochastic metric constraint is a stockout constraint $EST(\lambda, D^{\hat{}}) \leq H$ for some predetermined threshold H.

19. The optimization application according to claim 18 and, in the case that $EST(\lambda, D^*)>H$, operable to numerically solve the Lagrange system of equations:

$$F(\lambda_{ij}, D_{ij}) = \frac{p_{ij} - c_{ij} + b_{ij} - Mw_{ij}}{p_{ij} - g_{ij} + b_{ij} - Mw_{ij}} \text{ for all } i, j$$

and $$\sum_{ij} w_{ij} EST(\lambda_{ij}, D_{ij}) = H$$

for determining the optimal constrained draw matrix D^.

20. The optimization application according to claim 18 and, in the case that $EST(\lambda, D^*)>H$, operable to repeatedly allocate additional draw units one-by-one to draws of $D_{ij}$ $i^{th}$ $j^{th}$ item-locations of the single period inventory system for determining the optimal constrained draw matrix D^, each additional draw unit being allocated so as to result in the least decrease in the expected total profit attributable thereto.

21. The optimization application according to claim 19 and operable to initiate the allocation procedure from the optimal draw matrix D* for the single period inventory system.

22. The optimization application according to claim 15 wherein the stochastic metric constraint is a returns constraint $ER(\lambda, D^{\hat{}})<V$ for some pre-determined threshold V.

23. The optimization application according to claim 22 and, in the case that $ER(\lambda, D^*)>V$, operable to numerically solve the Lagrange system of equations:

$$F(\lambda_{ij}, D_{ij}) = \frac{p_{ij} - c_{ij} + b_{ij}}{p_{ij} - g_{ij} + b_{ij} - Mw_{ij}} \text{ for all } i, j$$

and $$\sum_{ij} w_{ij} ER(\lambda_{ij}, D_{ij})) = V$$

for determining the optimal constrained draw matrix D^.

24. The optimization application according to claim 22 and, in the case that $ER(\lambda, D^*)>V$, operable to repeatedly remove draw units one-by-one from draws $D_{ij}$ $i^{th}$ item-locations of the single period inventory system for determining the optimal constrained draw matrix D^, each removed draw unit being selected so as to result in the least decrease in the expected total profit attributable thereto.

25. The optimization application according to claim 24 and operable to initiate the removal procedure of draw units from the optimal draw matrix D* for the single period inventory system.

26. The optimization application according to claim 15 and operable to communicate the expected values of at least one stochastic metric for at least two draws together with their associated expected total profit (ETP) and/or expected total bookkeeping profit (ETBP) respectively given by:

$$ETP = \sum_{ij} EP_{ij} = \sum_{ij} [(p_{ij} - c_{ij})D_{ij} - (p_{ij} - g_{ij})ER(\lambda_{ij}, D_{ij}) - b_{ij}EST(\lambda_{ij}, D_{ij})]$$

and $$ETBP = \sum_{ij} EBP_{ij} = \sum_{ij} [(p_{ij} - c_{ij})D_{ij} - (p_{ij} - g_{ij})ER(\lambda_{ij}, D_{ij})].$$

27. The optimization application according to claim 26 wherein the at least one stochastic metric is one or more of the following: expected weighted total, sales, expected weighted total stockout, and expected weighted total returns.

28. The optimization application according to claim 15 wherein the consumer item is a printed media publication.

29. Computer implemented method for determining the most profitable distribution policy for a single period inventory system subject to a stochastic metric constraint, the method comprising the steps of:

(a) storing historical sales data of the sales information of each $i^{th}$ consumer item where i=1, 2, . . . , m at each $i^{th}$ location where j=1, 2, . . . , n of the single period inventory system;

(b) forecasting the mean demand $\lambda_{ij}$ of each $i^{th}$ consumer item at each $j^{th}$ location of the single period inventory system on the basis of the historical sales data;

(c) receiving the unit retail price $p_{ij}$, the unit production cost $c_{ij}$, the unit return cost $g_{ij}$, and the unit stockout cost $b_{ij}$ of each $i^{th}$ consumer item at each $i^{th}$ location of the single period inventory system;

(d) receiving a threshold for the stochastic metric constraint, wherein the stochastic metric constraint is a sales target $ES(\lambda, D^{\hat{}}) \geq G$ for some pre-determined threshold G;

(e) determining the optimal constrained draw matrix D^ for the most profitable distribution policy for the single period inventory system satisfying the threshold; and (f) communicating the optimal constrained draw matrix D^ for the most profitable distribution policy for the single period inventory system;

wherein, in the case that $ES(\lambda, D^*)<G$, step (e) includes numerically solving the Lagrange system of equations:

$$F(\lambda_{ij}, D_{ij}) = \frac{p_{ij} - c_{ij} + b_{ij} + Mw_{ij}}{p_{ij} - g_{ij} + b_{ij} + Mw_{ij}} \text{ for all } i, j$$

-continued and $$\sum_{ij} w_{ij}(D_j - ER(\lambda_{ij}, D_{ij})) = G$$

for determining the optimal constrained draw matrix D^.

30. The method according to claim 29 wherein, in the case that ES($\lambda$, D*)<G, step (e) includes repeatedly allocating additional draw units one-by-one to draws $D_{ij}$ of $i^{th}$ $j^{th}$ item-locations of the single period inventory system for determining the optimal constrained draw matrix D^, each additional draw unit being allocated so as to result in the least decrease in the expected total profit attributable thereto.

31. The method according to claim 30 wherein step (e) includes initiating the allocation procedure of draw units from the optimal draw matrix D* for the single period inventory system.

32. The method according to claim 29 wherein the stochastic metric constraint is a stockout constraint EST($\lambda$, D)<H for some predetermined threshold H.

33. The method according to claim 32 wherein in the case that EST($\lambda$, D*)>H, step (e) includes numerically solving the Lagrange system of equations:

$$F(\lambda_{ij}, D_{ij}) = \frac{p_{ij} - c_{ij} + b_{ij} - Mw_{ij}}{p_{ij} - g_{ij} + b_{ij} - Mw_{ij}} \text{ for all } i, j$$

and $$\sum_{ij} w_{ij} EST(\lambda_{ij}, D_{ij}) = H$$

for determining the optimal constrained draw matrix D^.

34. The method according to claim 32 wherein in the case that EST($\lambda$, D*)>H, step (e) includes repeatedly allocating additional draw units one-by-one to draws $D_{ij}$ of $i^{th}$ $j^{th}$ item-locations of the single period inventory system for determining the optimal constrained draw matrix D^, each additional draw unit being allocated so as to result in the least decrease in the expected total profit attributable thereto.

35. The method according to claim 34 wherein step (e) includes initiating the allocation procedure of draw units from the optimal draw matrix D* for the single period inventory system.

36. The method according to claim 29 wherein the stochastic metric constraint is a returns constraint ER($\lambda$, D^)<V for some pre-determined threshold V.

37. The method according to claim 36 wherein, in the cause that ER($\lambda$, D*)>V, step (e) includes numerically solving the Lagrange system of equations:

$$F(\lambda_{ij}, D_{ij}) = \frac{p_{ij} - c_{ij} + b_{ij}}{p_{ij} - g_{ij} + b_{ij} - Mw_{ij}} \text{ for all } i, j$$

and $$\sum_{ij} w_{ij} ER(\lambda_{ij}, D_{ij})) = V$$

for determining the optimal constrained draw matrix D^.

38. The method according to claim 36 wherein, in the case that ER($\lambda$, D*)>V, step (e) includes repeatedly removing draw units one-by-one from draws $D_{ij}$ of $i^{th}$ $j^{th}$ item-locations of the single period inventory system for determining the optimal constrained draw matrix D^, each removed draw unit being selected so as to result in the least decrease in the expected total profit attributable thereto.

39. The method according to claim 38 wherein step (e) initiates the removal procedure of draw units from the optimal draw matrix D* for the single period inventory system.

40. The method according to claim 29 and step (f) includes communicating the expected values of at least one stochastic metric for at least two draws together with their associated expected total profit and/or expected total bookkeeping profit (ETBP) respectively given by:

$$ETP = \sum_{ij} EP_{ij}$$
$$= \sum_{ij} \left[ (p_{ij} - c_{ij})D_{ij} - (p_{ij} - g_{ij})ER(\lambda_{ij}, D_{ij}) - b_{ij}EST(\lambda_{ij}, D_{ij}) \right]$$

and $$ETBP = \sum_{ij} EBP_{ij}$$
$$= \sum_{ij} \left[ (p_{ij} - c_{ij})D_{ij} - (p_{ij} - g_{ij})ER(\lambda_{ij}, D_{ij}) \right].$$

41. The method according to claim 40 wherein the at least one stochastic metric is one or more of the following: expected weighted total sales, expected weighted total stockout, and expected weighted total returns.

42. The method according to claim 29 wherein the consumer item is a printed media publication.

* * * * *

UNITED STATES PATENT AND TRADEMARK OFFICE
CERTIFICATE OF CORRECTION

PATENT NO.        : 7,313,532 B2
APPLICATION NO. : 10/230411
DATED              : December 25, 2007
INVENTOR(S)      : Mariamova et al.

It is certified that error appears in the above-identified patent and that said Letters Patent is hereby corrected as shown below:

On page 2, under "Other Publications", in column 2, line 13, delete "3d" and insert -- 3rd --, therefor.

In column 2, line 41, delete "at $j^{th}$" and insert -- at a $j^{th}$ --, therefor.

In column 3, line 11, delete "$=\sum\sum w_{ij} \, EST(\lambda_{ij}, D_{ij}) = \sum\sum w_{ij}$" and insert -- $= \sum\sum w_{ij} EST(\lambda_{ij}, D_{ij}) = \sum\sum w_{ij}$ --, therefor.

In column 4, line 59, delete "$EST(\lambda, D \,\hat{}\,)$" and insert -- $EST(\lambda, \hat{D})$ --, therefor.

In column 5, line 26, delete "each ij" and insert -- each i, j --, therefor.

In column 5, line 49, delete "$(\lambda_{ij}, D_{ij})$." and insert -- $(\lambda_{ij}, D_{ij}))$. --, therefor.

In column 6, line 11, delete "$(D_{ij\text{-}ER}$" and insert -- $(D_{ij}\text{-}ER$ --, therefor.

In column 6, line 23, after "respectively" insert -- . --.

In column 7, line 14, delete "G-=72" and insert -- G=72 --, therefor.

In column 7, line 15, delete "vector)," and insert -- vector --, therefor.

In column 7, line 55, after "each" delete "it" and insert -- $i^{th}$ --, therefor.

In column 9, line 8, delete "1,2" and insert -- 1, 2 --, therefor.

In column 9, line 18, delete "G-=72" and insert -- G=72 --, therefor.

In column 10, line 59, in Claim 1, delete "I=1," and insert -- i=1, --, therefor.

In column 11, line 29, in Claim 2, after "draws" delete "of".

In column 11, line 39, in Claim 4, delete "D*" and insert -- $\hat{D}$ --, therefor.

In column 11, line 57, in Claim 6, delete "H ," and insert -- H, --, therefor.

UNITED STATES PATENT AND TRADEMARK OFFICE
CERTIFICATE OF CORRECTION

PATENT NO. : 7,313,532 B2
APPLICATION NO. : 10/230411
DATED : December 25, 2007
INVENTOR(S) : Mariamova et al.

It is certified that error appears in the above-identified patent and that said Letters Patent is hereby corrected as shown below:

In column 11, line 62, in Claim 6, delete "roast" and insert -- least --, therefor.

In column 12, line 1, in Claim 8, delete "th" and insert -- the --, therefor.

In column 12, line 2, in Claim 8, delete "<V" and insert -- $\leq V$ --, therefor.

In column 12, line 3, in Claim 8, delete "predetermined" and insert -- pre-determined --, therefor.

In column 12, line 13, in Claim 9, delete "$D_{ij}$))" and insert -- $D_{ij}$) --, therefor.

In column 12, line 60, in Claim 15, delete "pre- Mar. 14, 2007 determined" and insert -- pre-determined --, therefor.

In column 12, line 66, in Claim 15, delete "ease" and insert -- case --, therefor.

In column 13, line 42, in Claim 20, delete "of $D_{ij}$" and insert -- $D_{ij}$ of --, therefor.

In column 13, line 64, in Claim 23, delete "$D_{ij}$))" and insert -- $D_{ij}$) --, therefor.

In column 14, line 3, in Claim 24, delete "$D_{ij}$ $i^{th}$" and insert -- $D_{ij}$ of $i^{th}$ $j^{th}$ --, therefor.

In column 14, line 31, in Claim 27, delete "total," and insert -- total --, therefor.

In column 15, line 5, in Claim 29, delete "$D_j$" and insert -- $D_{ij}$ --, therefor.

In column 15, line 25, in Claim 32, delete "<H" and insert -- $\leq H$ --, therefor.

In column 15, line 52, in Claim 36, delete "<V" and insert -- $\leq V$ --, therefor.

In column 16, line 2, in Claim 37, delete "cause" and insert -- case --, therefor.

In column 16, line 10, in Claim 37, delete "$D_{ij}$))" and insert -- $D_{ij}$) --, therefor.

UNITED STATES PATENT AND TRADEMARK OFFICE
CERTIFICATE OF CORRECTION

PATENT NO. : 7,313,532 B2
APPLICATION NO. : 10/230411
DATED : December 25, 2007
INVENTOR(S) : Mariamova et al.

It is certified that error appears in the above-identified patent and that said Letters Patent is hereby corrected as shown below:

In column 16, line 16, in Claim 38, delete "$(\lambda,D^*)$" and insert -- $(\lambda, D^*)$ --, therefor.

Signed and Sealed this

Second Day of December, 2008

JON W. DUDAS
*Director of the United States Patent and Trademark Office*